3,354,133
VULCANIZABLE COPOLYMERS OF TETRAHYDROFURAN WITH UNSATURATED EPOXY COMPOUNDS PREPARED IN THE PRESENCE OF ORGANOANTIMONY HEXACHLORIDE
Henry L. Hsieh, Bartlesville, Okla., assignor to Phillips Petroleum Company, a corporation of Delaware
No Drawing. Filed Sept. 18, 1964, Ser. No. 397,616
7 Claims. (Cl. 260—88.3)

ABSTRACT OF THE DISCLOSURE

Tetrahydrofuran and unsaturated epoxy compounds are copolymerized in the presence of a catalyst formed of complex compounds of organic halides with antimony pentachloride to produce vulcanizable polyalkylene ether polymers.

---

This invention relates to a process for the production of novel polyalkylene ether copolymers which may be conveniently cured to form highly useful elastomers. In one aspect, it relates to a process for polymerizing unsaturated epoxy compounds with tetrahydrofuran in the presence of a catalyst consisting of complex compounds of certain organic halides with antimony pentachloride to produce vulcanizable polyalkylene ether polymers.

Heretofore various types of polar polymers have been prepared, usually by methods involving the polymerization of cyclic ethers or polyhydroxy compounds, and these polymers range from relatively low molecular weight liquids and oils to relatively high molecular weight liquids and solids. These polymers, however, do not, on curing, form useful elastomers. For instance, it has been known to polymerize tetrahydrofuran but the polymers produced from such a polymerization reaction are not sulfur vulcanizable.

It is an object of this invention to provide a method for producing a polyether copolymer which is highly stable and which may be conveniently cured to useful elastomers by means of well known curing procedures. Another object of this invention is to provide a catalyst system for use in the copolymerization of tetrahydrofuran with an unsaturated epoxy compound. A still further object of the invention is to provide a novel process for copolymerizing tetrahydrofuran with an unsaturated epoxy compound to a solid polymer capable of being sulfur vulcanizable.

Other objects, aspects, and advantages of this invention will be readily appreciated as the same become better understood by reference to the following detailed description.

The instant invention resides in the discovery of a process whereby liquid and solid copolymers of tetrahydrofuran and unsaturated epoxy compounds, having a capability for being sulfur vulcanizable, are obtained. Broadly speaking, the process comprises contacting an unsaturated epoxy compound and tetrahydrofuran with a catalyst.

The catalysts employed in this invention can be represented by the formula $R'_3CsBCl_6$ wherein each $R'$ is individually selected from a group consisting of methyl, phenyl, 1- and 2-naphthyl, and 2-, 3-, and 4-biphenylyl groups. Aryl groups can contain alkyl, alkenyl, and alkoxy substituents not to exceed a total of 6 carbon atoms in substituents. These catalysts are prepared by mixing equivalent moles of $R'_3CCl$ and $SbCl_5$ in an inert diluent such as chloroform or carbon tetrachloride. The reaction can be carried out at room temperature or at an elevated temperature if so desired. The reaction produces a yellow crystalline precipitate which can be separated and purified. The crystalline precipitate is stable in dry air. These catalysts are employed in the form of a powder which is dispersed in a suitable diluent such as a hydrocarbon, ether, or the like. Examples of suitable catalysts prepared in this manner are:

triphenylantimony hexachloride
trimethylantimony hexachloride
methyldiphenylantimony hexachloride
dimethylphenylantimony hexachloride
tri(2,4,6-trimethylphenyl)antimony hexachloride
tri(2,4,6-triethylphenyl)antimony hexachloride
tri(4-n-hexylphenyl)antimony hexachloride
tri(3,5-diisopropylphenyl)antimony hexachloride
methyldi(4-butoxyphenyl)antimony hexachloride
dimethyl-2,6-dimethoxyphenylantimony hexachloride
tri-4-vinylphenylantimony hexachloride
tri-3-(2-propenyl)phenylantimony hexachloride
tri-2-ethyl-4-(2-butenyl)phenylantimony hexachloride
tri-1-naphthylantimony hexachloride
tri-2-naphthylantimony hexachloride
methyldi-2-(3,6-dimethyl)naphthylantimony hexachloride
dimethyl-1-(4-ethoxy)naphthylantimony hexachloride
tri-2-(7-vinyl)naphthylantimony hexachloride
tri-2-biphenylylantimony hexachloride
tri-3-biphenylylantimony hexachloride
tri-4-biphenylylantimony hexachloride
tri-4-(2,3,2',3'-tetramethyl)biphenylylantimony hexachloride
tri-2-(4-isopropenyl)biphenylylantimony hexachloride
tri-3-(4'-n-hexoxy)biphenylylantimony hexachloride The catalyst concentration is in the range of about 0.5 to 10 millimoles per 100 grams of monomers, larger amounts of catalyst have adverse effects such as low conversion and low molecular weight presumably caused by depolymerization, preferably in the range of 2 to 5 millimoles per 100 grams of monomers. The inherent viscosity of the copolymer is inversely related to the catalyst level. The range of catalyst concentrations will vary with polymerization temperature, the amount of diluent, the type and amount of comonomer employed, and the type of copolymer desired. As stated hereinabove, copolymers ranging from liquids to rubbers can be prepared by the process of this invention.

The process of this invention can be carried out with or without an inert diluent. Frequently the only diluent added is that used for dispersion of the catalyst. While it is not mandatory that the catalyst be supplied to the process in the form of a dispersion, such a means affords a convenient method for charging it to the reactor. However, a hydrocarbon diluent is generally employed such as one selected from the group consisting of paraffins, cycloparaffins, and aromatic hydrocarbons, which is liquid under conditions of the process. Examples of suitable hydrocarbon diluents include: benzene, toluene, xylene, ethylbenzene, isobutane, n-pentane, isooctane, n-decane, cyclopentane, methylcyclopentane, dimethylcyclopentane, ethylcyclopentane, cyclohexane, methylcyclohexane, dimethylcyclohexane, and other such aliphatic, cycloaliphatic, and aromatic hydrocarbons containing up to and including 10 carbon atoms per molecule. Mixtures of these solvents can also be employed in the process. It is also in the scope of the invention to use as the diluent other materials which are inert under the conditions of the process. For example, ethers, such as tert-butyl methyl ether, ethyl methyl ether, ethyl propyl ether, di-n-propyl ether, and diisopropyl ether, can be advantageously utilized. In general, only enough diluent is employed to permit dispersing the catalyst therein.

The polymerization temperature can vary over a rather wide range, e.g., from —100° to 250° F.; however, it is preferred to operate at a temperature in the range of about 30° to 122° F. in order to minimize depolymerization. The reaction time can also vary over rather broad limits, such as about from 5 minutes to 75 hours or more. The pressure used during the polymerization reaction can vary from atmospheric and below to 500 p.s.i.g. and higher. It is usual to operate at a pressure wherein the reaction mixture is maintained substantially in the liquid phase.

The unsaturated epoxy compounds employed as comonomers with tetrahydrofuran are selected from the group consisting of unsaturated epoxy ethers and epoxy alkenes containing from 4–20 carbon atoms per molecule. They can be represented by the formula:

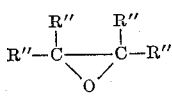

wherein R″ is selected from the group consisting of hydrogen, saturated aliphatic, saturated cycloaliphatic, monoolefinic aliphatic, diolefinic aliphatic (conjugated and non-conjugated), monoolefinic cycloaliphatic, diolefinic cycloaliphatic (conjugated and non-conjugated), aromatic radicals, and combinations thereof, and can contain oxygen in the form of an acyclic ether linkage (—O—) or an oxirane group:

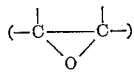

and the compound can contain 1 or 2 olefinic linkages, 1 or 2 oxirane groups, and 0 or 1 ether linkages.

It is to be understood that compounds of these types that contain more than one epoxy group and more than one ethylenic linkage are considered within the scope of the compounds that are applicable in this invention.

Examples of such compounds include:

allyl-2,3-epoxypropyl ether (allyl glycidyl ether)
allyl-3,4-epoxybutyl ether
1-methallyl-3,4-epoxyhexyl ether
3-hexenyl-5,6-epoxyhexyl ether
2,6-octadienyl-2,3,7,8-diepoxyoctyl ether
6-phenyl-3-hexenyl-3-ethyl-5,6-epoxyhexyl ether
3,4-epoxy-1-butene (butadiene monoxide)
3,4-epoxy-1-pentene
5-phenyl-3,4-epoxy-1-pentene
1,2,9,10-diepoxy-5-decene
6,7-di-n-butyl-3,4,9,10-diepoxy-1,11-dodecadiene
  epoxy vinyl ether
allyl 2-methyl-2,3-epoxypropyl ether
3-cyclohexyl-2-propenyl 4-cyclohexyl-3,4-epoxybutyl ether
3,4-pentadienyl 2,3-diethyl-3,4-epoxybutyl ether
1-methallyl 6-phenyl-3,4-epoxyhexyl ether
5-(4-tolyl)2,3-epoxypentyl vinyl ether
bis [4-(3-cyclopentenyl)2,3-epoxybutyl] ether
2-(2,4-cyclohexadienyl)-ethyl 2,3-epoxybutyl ether
2-(2,5-cyclohexadienyl)ethyl 2-benzyl-4,5-epoxypentyl
  ether
3,4-epoxy-1,5-hexadienyl isopropyl ether
allyl 3,4-dimethyl-3,4-epoxyhexyl ether
3,4-epoxy-4-(2,3-dimethylphenyl) 1-butene
3,4-dimethyl-3,4-epoxy-1-pentene
5-(4-methylcyclohexyl)-3,4-epoxy-1-pentene
4,5-diethyl-4,5-epoxy-2,6-octadiene
4-(2,4-cyclopentadienyl) 1,2,6,7-diepoxyheptane
1-phenyl-1,2-epoxy-5,7-octadiene.

Tetrahydrofuran can be copolymerized with one or a mixture of any of these unsaturated epoxy compounds.

While the monomer ratio can vary over a broad range, it is to be understood that the conversion to a copolymer as well as the resulting properties of the copolymer are dependent on the relative amounts of tetrahydrofuran and the epoxy compound in the polymerization mixture. The unsaturated epoxy compound is employed in a range of 4–96 parts by weight per 100 parts by weight of total monomers, generally in a range of 4–50 parts by weight per 100 parts by weight of total monomer, in order that the copolymer will be readily vulcanizable. The unsaturation of the resulting copolymer increases linearly with the increasing amount of unsaturated epoxy compounds incorporated into the copolymer molecule.

In addition to the unsaturated epoxy compounds which render the copolymers vulcanizable, it is to be understood that minor amounts of other polymerizable compounds can be added to the system to change the polymerization rate, increase monomer conversion, and vary properties of the copolymer, such as molecular weight, oil resistance, etc. Such compounds are generally polar and include ethylene oxide, propylene oxide, styrene oxide, epichlorohydrin, tetrahydrofurfuryl methacrylate, and the like. Quantities of the materials, conveniently referred to as modifiers, usually do not exceed 25 parts by weight per 100 parts by weight of total monomers and frequently desired results can be obtained with 10 parts by weight or less per 100 parts by weight of total monomers.

Upon completion of the polymerization, the catalyst is deactivated by the addition of water, alcohol, or the like. The copolymer is then separated from the reaction mixture by any suitable method. In one method, the reaction mixture is heated so as to distill off the diluent, leaving the polymeric product. The copolymer can be readily recovered by coagulation with an alcohol followed by any suitable separation method, such as filtration or decantation.

Cured polyether copolymers of the present invention may be conveniently obtained by procedures involving the use of sulfur and these cured copolymers are within the scope of the present invention. Generally curing is effected by heating the copolymer to a temperature of at least 200° F. with sulfur in the presence of vulcanization accelerators. These sulfur-curing procedures are more particularly illustrated in the following examples. Normally about 0.1 to 2.5 parts of sulfur per 100 parts of copolymer is needed to effect the cure in the presence of appropriate accelerators. Various other compounding ingredients such as carbon black, mineral fillers, plasticizers, and antioxidants can also be incorporated into the copolymers. Curing is effected by heating, usually at about 200–300° F. for from one-half to several hours. It is to be understood that various modifications of the sulfur cure may be employed, depending on the type of polyether copolymer used, and that these various procedures and modifications of sulfur-curing are well within the skill of the rubber art.

The polymers prepared according to this invention have many varied uses such as motor mounts, body mounts, suspension system parts, boots, hose, and tubing. They are particularly characterized by good tensile properties, low temperature flexibility, and excellent oil and ozone resistance.

A more comprehensive understanding of the invention can be obtained by referring to the following illustrative examples, which are not intended, however, to be unduly limitative of the invention.

EXAMPLE I

A series of runs was carried out in which tetrahydrofuran was copolymerized with allyl glycidyl ether to liquid and solid copolymers. All runs were carried out in an atmosphere of nitrogen and the procedure was varied in order to show the effect of the particular catalyst upon the copolymerization results. It will be noted that antimony pentachloride when employed as a catalyst per se, gave lower conversion results than run 1 which is the result of the process of the invention, and the products frequently contained large quantities of gel.

The recipe for these runs was as follows:

| | |
|---|---|
| Tetrahydrofuran, grams | 95 |
| Allyl glycidyl ether, grams | 5 |
| Cyclohexane, milliliters | 50 |
| Catalyst, millimoles | (¹) |
| Temperature, °F. | 41 |
| Time, hours | 20 |

¹ The polymerizing procedure was varied in that the make-up of the catalyst was changed for some of the runs as will be hereinafter described according to the particular run numbers, which are as follows:

*Run 1.*—The polymerization initiator, or catalyst, was prepared by mixing triphenylchloromethane with antimony pentachloride at room temperature (approximately 75° F.) using carbon tetrachloride as the diluent. The reactants were employed in a 1:1 mole ratio, 5 millimoles of each being required for the above designated recipe. A yellow crystalline complex compound which was triphenylmethylantimony hexachloride, was separated by centrifuging the mixture. It was purified by dissolving in hot methylene chloride followed by precipitation with carbon tetrachloride. Melting point was 464° F. The solid was then dispersed in 50 milliliters of cyclohexane. When carrying out the polymerization, tetrahydrofuran was charged first followed by allyl glycidyl ether and then the catalyst.

*Run 2.*—The two materials used to form the catalyst in run 1 were charged separately. Triphenylchloromethane (5 millimoles) was charged first followed by the cyclohexane, tetrahydrofuran, allyl glycidyl ether, and finally the antimony pentachloride (5 millimoles).

*Run 3.*—Triphenylchloromethane was charged first followed by the cyclohexane, tetrahydrofuran, and then the allyl glycidyl ether. No antimony pentachloride was added.

*Run 4.*—Tetrahydrofuran was charged first followed by the allyl glycidyl ether, cyclohexane, and then the antimony pentachloride. No triphenylchloromethane was used in this run.

At the conclusion of the polymerization, each reaction mixture was poured into methanol to coagulate the polymer which was then separated and dried in a vacuum oven at 60° C. A summary of the four runs is presented in Table I.

As can be seen from the data, the run in which the complex catalyst was used produced an elastomer whereas a much lower inherent viscosity polymer which was not rubbery was formed in runs 2 and 4. In run 2 both catalyst components were employed but were not allowed to react prior to being charged to the polymerization. The results were similar to those of run 4 in which SbCl₅ was used alone. Run 3 demonstrates that triphenylchloromethane by itself does not initiate polymerization.

EXAMPLE II

Tetrahydrofuran and allyl glycidyl ether were copolymerized in a series of runs in the presence of a catalyst formed by reacting antimony pentachloride with triphenylchloromethane. Catalyst preparation and polymerization procedure were as described in Example I. Polymerization temperature was 41° F. A control run was carried out using antimony pentachloride as the catalyst. Runs are summarized in Table II.

TABLE II

| Run No. | THF/AGE Wt. Ratio | Catalyst Level, mhm. | Cyclohexane, ml. | Time, hrs. | Conv., Percent | Inh. Visc. | Gel, Percent | Unsaturation ICl/g. Polymer |
|---|---|---|---|---|---|---|---|---|
| 5 | 95/5 | 5 | 50 | 18 | 80 | 1.27 | 0 | 0.39 |
| 6 | 95/5 | 5 | 50 | 20 | 60 | ² 0.93 | 0 | 0.56 |
| 7 | 95/5 | 5 | ¹ 50 | 20 | 60 | ² 1.04 | 0 | 0.42 |
| 8 | 95/5 | 2.5 | 25 | 20 | 60 | ³ 1.61 | 0 | 0.53 |
| 9 | 90/10 | 5 | 50 | 60 | 90 | 1.06 | 0 | 0.98 |
| 10 | 90/10 | 2.5 | 25 | 20 | 60 | ⁴ 1.53 | 0 | 0.80 |
| 11 | 85/15 | 5 | 50 | 60 | 90 | 1.01 | 0 | 1.35 |
| 12 | 90/10 | 4.2 | 25 | 20 | 49 | 0.52 | 31 | 0.39 |

¹ n-Hexane used.
² ML-4 at 212° F.=6. (ML-4 is the Mooney value for the copolymer obtained by the Mooney value method in accordance with the procedure of ASTM-D-1646-61.)
³ ML-4 at 212° F.=51.
⁴ ML-4 at 212° F.=26.
⁵ Control using SbCl₅ catalyst.
THF=tetrahydrofuran; AGE=allyl glycidyl ether; mhm.=millimoles per 100 grams monomers.

At the conclusion of the polymerization, a solution of 2,2'-methylene-bis(4-methyl-6-tert-butylphenol) in a mixture containing equal parts by volume of isopropyl alcohol and toluene was added to runs 5, 6, and 7. The amount of solution used was sufficient to provide approximately 0.5 part by weight of the phenolic antioxidant per 100 parts by weight copolymer. The reaction mixtures were poured into methanol to coagulate the copolymers which were then separated and dried in a vacuum oven at 60° C. In runs 8 and 10 approximately 500 milliliters of tetrahydrofuran was added to each polymerization mixture followed by about 0.5 part of 2,2'-methylene-bis(4-

TABLE I

| | 1 | 2 | 3 | 4 |
|---|---|---|---|---|
| Initiator | φ₃CSbCl₆ | φ₃CCl plus SbCl₅¹ | φ₃CCl | SbCl₅. |
| Conversion, percent | 60 | 49 | 0 | 50. |
| Inherent viscosity ³ | 1.34 | 0.89 | | 0.89. |
| Unsaturation, mmoles ICl/g. polymer ² | 0.38 | 0.27 | | 0.39. |
| Gel, percent ⁴ | | | | 40. |
| Type of polymer | Rubber | Very sticky, soft polymer | | Sticky, soft polymer. |

¹ Charged separately, 5 moles of each compound.
² The procedure used to determine total unsaturation by iodine chloride titration was as follows: a 0.5 gram sample of polymer was dissolved in a 75/25 volume mixture of carbon disulfide and chloroform, a chloroform solution of iodine chloride of known concentration (approximately 0.09-0.10 molar) was added, the mixture was placed in a 25° C. bath for one hour to allow time for reaction, and the excess of iodine chloride was titrated with 0.05 N sodium thiosulfate. The millimoles of iodine chloride that reacted with 1 gram of sample was then calculated. A blank was run using only solvent and iodine chloride and appropriate correction was made when calculating unsaturation.
³ One-tenth gram of polymer was placed in a wire cage made from 80 mesh screen and the cage was placed in 100 milliliters of toluene contained in a wide-mouthed, 4-ounce bottle. After standing at room temperature (approximately 77° F.) for 24 hours, the cage was removed and the solution was filtered through a sulfur absorption tube of grade C porosity to remove any solid particles present. The resulting solution was run through a medalia type viscometer supported in a 77° F. bath. The viscometer was previously calibrated with toluene. The relative viscosity is the ratio of the viscosity of the polymer solution to that of toluene. The inherent viscosity is calculated by dividing the natural logarithm of the relative viscosity by the weight of the soluble portion of the original sample.
⁴ Determination of gel was made along with the inherent viscosity determination. The wire cage was calibrated for toluene retention in order to correct the weight of swelled gel and to determine accurately the weight of dry gel. The empty cage was immersed in toluene and then allowed to drain three minutes in a closed wide-mouthed, 2-ounce bottle. A piece of folded ¼ inch hardware cloth in the bottom of the bottle supported the cage with minimum contact. The bottle containing the cage was weighed to the nearest 0.02 gram during a minimum 3-minute draining period after which the cage was withdrawn and the bottle again was weighed to the nearest 0.02 gram. The difference in the two weighings is the weight of the cage plus the toluene retained by it, and by subtracting the weight of the empty cage from this value the weight of toluene retention is found, i.e., the cage calibration. In the gel determination, after the cage containing the sample had stood for 24 hours in toluene, the cage was withdrawn from the bottle with the aid of forceps and placed in the 2-ounce bottle. The same procedure was followed for determining the weight of swelled gel as was used for calibration of the cage. The weight of swelled gel was corrected by subtracting the cage calibration.

methyl-6-tert-butylphenol) dissolved in tetrahydrofuran. The copolymer dissolved in tetrahydrofuran and was coagulated in methanol, separated, and dried as in the first three runs. Recovery of the copolymers from runs 9, 11, and 12 was the same as described in Example I.

The copolymers prepared in runs 5–11 were elastomers whereas the control copolymer in run 12 was a viscous, sticky material. As can be seen from the data, the inherent viscosity of the copolymer in this run was low and polymerization reached a much lower conversion than it did in the other runs.

EXAMPLE III

The copolymers from runs 5, 8, and 10, and a 50/50 weight blend of polymers from runs 2 and 7 of Example II were evaluated in gum and carbon black recipes. Compounding recipes and physical properties of vulcanizates are presented in Table III.

In summary, it will be observed that the copolymerization of tetrahydrofuran with an unsaturated epoxy compound, i.e., allyl glycidyl ether, using as the catalyst to initiate the polymerization reaction one from the group consisting of trimethylmethylantimony hexachloride and triphenylmethylantimony hexachloride results in an elastomeric copolymer wherein the inherent viscosity and the elastomeric characteristics of the resulting copolymer are able to be controlled and that the copolymer is easily sulfur vulcanizable, resulting in a cured compound that has a high tensile strength and a resistance to ozone. The use of the catalyst system of this invention to polymerize tetrahydrofuran by itself results in a polymer which cannot be cured.

As will be evident to those skilled in the art, many variations and modifications of the invention can be practiced upon consideration of the foregoing disclosure. Such

TABLE III

| | 1 | 2 | 3 | 4 | 5 | 6 | 7 | 8 |
|---|---|---|---|---|---|---|---|---|
| Copolymer from run | 5 | 5 | 6 and 7 | 6 and 7 | 8 | 8 | 10 | 10 |

Compounding Recipes, Parts by Weight

| | | | | | | | | |
|---|---|---|---|---|---|---|---|---|
| Copolymer | 100 | 100 | 100 | 100 | 100 | 100 | 100 | 100 |
| High abrasion furnace black | | 50 | 50 | 50 | 50 | | | |
| Zinc oxide | 5 | 5 | 5 | 5 | 5 | 5 | 5 | 5 |
| Stearic acid | 1.0 | 1.0 | 0.5 | 0.5 | 0.5 | 0.5 | 0.5 | 0.5 |
| Flexamine [1] | 1 | 1 | 1 | 1 | 1 | 1 | 1 | 1 |
| Sulfur | 2.0 | 2.0 | 2.0 | 2.5 | 2.0 | 2.0 | 1.5 | 2.0 |
| Methyl Tuads [2] | 1.00 | 1.00 | 1.00 | 1.25 | 1.00 | 1.00 | 0.75 | 1.00 |
| Captax [3] | 1.00 | 1.00 | 1.00 | 1.25 | 1.00 | 1.00 | 0.75 | 1.00 |

Properties of Vulcanizates

| | | | | | | | | |
|---|---|---|---|---|---|---|---|---|
| Curing temp., °F | 307 | 307 | 307 | 307 | 307 | 307 | 307 | 307 |
| Curing time, hrs | 45 | 45 | 30 | 30 | [4] 30 | [4] 30 | [4] 30 | [4] 30 |
| 300% Modulus, p.s.i | 270 | 1,959 | 2,000 | 2,290 | | 360 | 310 | |
| Tensile, p.s.i | 2,690 | 3,300 | 2,910 | 3,030 | 2,480 | 2,620 | 510 | 390 |
| Elongation, percent | 820 | 480 | 450 | 400 | 250 | 730 | 380 | 260 |
| Shore A hardness | | | 66 | 70 | 77 | 50 | 45 | 51 |
| Resilience, percent | | | 57.5 | 63.9 | 68.7 | 88.8 | 86.7 | 88.2 |
| ΔT, °F | | | 101.6 | 84.6 | 68.0 | 17.7 | 25.0 | 20.8 |

[1] Physical mixture containing 65 percent of a complex diarylamineketone reaction product and 35 percent of N,N-diphenyl-p-phenylenediamine.
[2] Tetramethylthiuram disulfide.
[3] 2-mercaptobenzothiazole.
[4] Hardness, resilience, and heat build-up tests made on samples cured 40 minutes at 307° F.

The data show that the copolymers can be compounded in both gum and carbon black reinforced recipes to give vulcanizates having relatively high tensile strength. Vulcanizates from gum recipes 6, 7, and 8 had high resilience and very low heat build-up.

EXAMPLE IV

Tetrahydrofuran and allyl glycidyl ether were copolymerized in a series of runs at different temperatures using triphenylmethylantimony hexachloride as the catalyst, prepared as described in Example I. A 95/5 tetrahydrofuran/allyl glycidyl ether weight ratio was used. Data are presented in Table IV.

TABLE IV

| Run No. | $\phi_3CSbCl_6$, mhm. | Cyclohexane, ml./100 g. Monomers | Temp., °F | Time, hrs. | Conv., percent |
|---|---|---|---|---|---|
| 13 | 2.5 | 50 | −24 | 20 | 51 |
| 14 | 5.0 | 50 | −24 | 20 | 69 |
| 15 | 2.5 | 50 | 41 | 20 | 84 |
| 16 | 5.0 | 50 | 41 | 20 | 81 |
| 17 | 2.5 | 50 | 80 | 20 | 73 |
| 18 | 5.0 | 50 | 80 | 20 | 68 |
| 19 | 2.5 | 50 | 122 | 20 | 49 |
| 20 | 5.0 | 50 | 122 | 20 | 68 |

The data show that polymerization can be carried out over a broad temperature range. Rubbery polymers were obtained.

variations and modifications are believed to be within the spirit and scope of this invention.

I claim:

1. A process for polymerizing a mixture of tetrahydrofuran and an unsaturated epoxy compound having from about 4 to 20 carbon atoms per molecule and represented by the formula

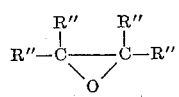

wherein R″ is selected from the group consisting of hydrogen, saturated aliphatic, saturated cycloaliphatic, monoolefinic aliphatic, diolefinic aliphatic (conjugated and non-conjugated), monoolefinic cycloaliphatic, diolefinic cycloaliphatic (conjugated and non-conjugated), aromatic radicals, and combinations thereof, and can contain oxygen in the form of an acyclic ether linkage (—O—) or an oxirane group

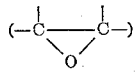

and the compound can contain 1 or 2 olefinic linkages, 1 or 2 oxirane groups, and 0 or 1 ether linkages which comprises contacting said mixture with a catalyst compound having the formula $R'_3CSbCl_6$ wherein each R' is a radical selected from the group consisting of methyl, phenyl, 1- and 2-naphthyl, and 2-, 3-, and 4-biphenylyl groups and alkyl, alkenyl, and alkoxy substituted forms of said phenyl, naphthyl, and biphenylyl groups, said substituted forms not to exceed a total of 6 carbon atoms in the substituents, said epoxy compound being present in the range of 4 to 96 parts by weight per 100 parts by weight of the mixture, and said catalyst compound being present in the range of about 0.5 to 10 millimoles per 100 grams of said mixture.

2. A process for copolymerizing a mixture of tetrahydrofuran and an unsaturated epoxy compound having from about 4 to 20 carbon atoms per molecule and represented by the formula

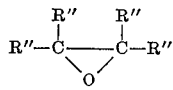

wherein R" is selected from the group consisting of hydrogen, saturated aliphatic, saturated cycloaliphatic, monoolefinic aliphatic, diolefinic aliphatic (conjugated and non-conjugated), monoolefinic cycloaliphatic, diolefinic cycloaliphatic (conjugated and non-conjugated), aromatic radicals, and combinations thereof, and can contain oxygen in the form of an acyclic ether linkage (—O—) or an oxirane group

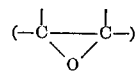

and the compound can contain 1 or 2 olefinic linkages, 1 or 2 oxirane groups, and 0 or 1 ether linkage which comprises charging to a reaction zone the tetrahydrofuran; charging to said reaction zone the unsaturated epoxy compound in an amount sufficient to cause said epoxy compound to be present in the range of 4 to 96 parts by weight per 100 parts by weight of said mixture; dispersing a catalyst compound having the formula R'$_3$CSbCl$_6$ wherein R' is a radical selected from the group consisting of methyl, phenyl, 1- and 2-naphthyl, and 2-, 3- and 4-biphenylyl groups and alkyl, alkenyl, and alkoxy substituted forms of said phenyl, naphthyl, and biphenylyl groups, said substituted forms not to exceed a total of 6 carbon atoms in the substituents, in an inert liquid diluent, said catalyst compound being present in the range of about 0.5 to 10 millimoles per 100 grams of said mixture; charging said catalyst diluent dispersion into said reaction zone; coagulating the copolymer produced and recovering the copolymer so produced.

3. A process according to claim 2 in which the amount of said catalyst dispersed in said diluent is in the range of 2 to 5 millimoles per 100 grams of said mixture and the amount of tetrahydrofuran does not exceed 96 parts by weight per 100 parts by weight of said mixture.

4. The process according to claim 2 in which said inert liquid diluent is one selected from the group consisting of paraffinic, cycloparaffinic and aromatic hydrocarbons, containing up to and including 10 carbon atoms per molecule, and ethers.

5. The process according to claim 2 in which said reaction zone is maintained at a temperature in the range of —100° to 250° F.

6. A process according to claim 1 for forming a copolymer of tetrahydrofuran and an unsaturated epoxy compound, which comprises charging tetrahydrofuran to a reaction zone; charging to said reaction zone allyl glycidyl ether; dispersing triphenylchloromethane in cyclohexane; charging said dispersion of triphenylchloromethane in cyclohexane into said reaction zone; maintaining the tempertaure in the reaction zone in the range of from 30° to 122° F. for a period ranging from 5 minutes to 75 hours; coagulating the copolymer product and recovering the copolymer so produced.

7. A process according to claim 1 for forming a copolymer of tetrahydrofuran and an unsaturated epoxy compound, which comprises charging tetrahydrofuran to a reaction zone; charging to said reaction zone allyl glycidyl ether; dispersing trimethylchloromethane in cyclohexane; charging said dispersion of trimethylchloromethane in cyclohexane into said reaction zone; maintaining the temperature in the reaction zone in the range of from 30° to 122° F. for a period ranging from 5 minutes to 75 hours, coagulating the copolymer product and recovering the copolymer so produced.

References Cited
FOREIGN PATENTS 834,158   3/1958   Great Britain.
1,120,139  12/1961  Germany.

OTHER REFERENCES

Lyudvig et al., Chem. Abs., 62 (1965), p. 14829h.

JOSEPH L. SCHOFER, *Primary Examiner.*

H. WONG, *Assistant Examiner.*